US010942330B2

(12) United States Patent
Ha et al.

(10) Patent No.: US 10,942,330 B2
(45) Date of Patent: Mar. 9, 2021

(54) CAMERA MODULE

(71) Applicant: Samsung Electro-Mechanics Co., Ltd., Suwon-si (KR)

(72) Inventors: Joo Young Ha, Suwon-si (KR); Sang Hyo Seo, Suwon-si (KR); Dae Seob Kim, Suwon-si (KR); Cheong Hee Lee, Suwon-si (KR); Young Mi Han, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 106 days.

(21) Appl. No.: 16/194,496

(22) Filed: Nov. 19, 2018

(65) Prior Publication Data

US 2019/0250363 A1 Aug. 15, 2019

(30) Foreign Application Priority Data

Feb. 9, 2018 (KR) .................. 10-2018-0016077
Jun. 11, 2018 (KR) .................. 10-2018-0066922

(51) Int. Cl.
*G02B 7/02* (2006.01)
*H04N 5/225* (2006.01)

(52) U.S. Cl.
CPC ........... *G02B 7/022* (2013.01); *H04N 5/2252* (2013.01); *H04N 5/2254* (2013.01)

(58) Field of Classification Search
CPC .......... G02B 7/02; G02B 7/021; G02B 7/022; G02B 7/026; G02B 7/028; G02B 27/0006; G03B 17/12; G03B 17/55; H04N 5/225; H04N 5/2252–2257; H05B 3/02; H05B 3/14; H05B 3/34; H05B 3/40; H05B 3/84; H05B 3/145; B60S 1/026

See application file for complete search history.

(56) References Cited

U.S. PATENT DOCUMENTS

| 10,609,262 | B2 | 3/2020 | Kim et al. | |
| 2008/0289171 | A1* | 11/2008 | Cheng | H01M 2/22 29/623.1 |
| 2010/0309553 | A1 | 12/2010 | Nagamizu | |
| 2012/0170119 | A1 | 7/2012 | Chu et al. | |

(Continued)

FOREIGN PATENT DOCUMENTS

| CN | 102123654 A | 7/2011 |
| CN | 103048854 A | 4/2013 |

(Continued)

OTHER PUBLICATIONS

Chinese Office Action dated Nov. 4, 2020 in corresponding Chinese Patent Application No. 201910104475.8 (10 pages in English and 10 pages in Chinese).

*Primary Examiner* — Mustak Choudhury
(74) *Attorney, Agent, or Firm* — NSIP Law

(57) ABSTRACT

A camera module includes a lens module including a lens barrel and a holder to hold the lens barrel, a heater to seal the lens module and including a first cutting portion having a D-shape, and a ring-shaped electrode portion including a second cutting portion having a D-shape and a third cutting portion having a D-shape. The electrode portion is coupled to two surfaces of the heater that are perpendicular to an optical axis direction to align the first cutting portion with the second cutting portion and the third cutting portion.

16 Claims, 15 Drawing Sheets

(56) References Cited

U.S. PATENT DOCUMENTS

| | | |
|---|---|---|
| 2013/0093947 A1 | 4/2013 | Lee et al. |
| 2017/0038661 A1* | 2/2017 | Ha |
| 2018/0176431 A1* | 6/2018 | Kim ........................ H05B 3/84 |
| 2018/0210161 A1 | 7/2018 | Park et al. |
| 2019/0033690 A1 | 1/2019 | Choi |

FOREIGN PATENT DOCUMENTS

| | | |
|---|---|---|
| CN | 105170126 A | 12/2015 |
| CN | 106233198 A | 12/2016 |
| CN | 206096730 U | 4/2017 |
| CN | 206780486 U | 12/2017 |
| DE | 10 2016 107 545 A1 | 10/2017 |
| JP | 2011-502340 A | 1/2011 |
| KR | 10-2017-0006724 A | 1/2017 |
| KR | 10-2017-0041360 A | 4/2017 |
| TW | M408051 U1 | 7/2011 |
| WO | WO 2010/052518 A2 | 5/2010 |
| WO | WO 2016/195403 A1 | 12/2016 |
| WO | WO 2017/142203 A1 | 8/2017 |

\* cited by examiner

CAMERA MODULE

CROSS-REFERENCE TO RELATED APPLICATIONS

This application claims the benefit under 35 USC 119(a) to Korean Patent Application No. 10-2018-0016077 filed on Feb. 9, 2018 and Korean Patent Application No. 10-2018-0066922 filed on Jun. 11, 2018 in the Korean Intellectual Property Office, the entire disclosures of which are incorporated herein by reference for all purposes.

BACKGROUND

1. Field

The following description relates to a camera module.

2. Description of Related Art

Generally, degradation of camera images due to a temperature change or a surrounding environment mostly occurs in surveillance cameras such as CCTV cameras, and the like. However, as the utilization of vehicle cameras has increased and a field of application thereof has expanded, it has become necessary to resolve the problem of image degradation caused by a surrounding environment. In other words, in most vehicles, a large number of cameras, such as surround view monitoring (SVM) cameras, and the like, have been provided in an advanced driver assistance system (ASAS), along with a rear-facing camera, and it has been expected that various cameras having a variety of functions will continue to be provided in vehicles.

In related art, when an ambient temperature is low, such as in winter, or other seasons, a heater has been additionally installed in a camera to prevent image degradation, and such a configuration is currently used, as a size and a shape of a camera are not generally affected, even when a heater is installed.

However, as the usage of vehicle cameras has increased, a camera installed in a vehicle is required to have a size and a structure which do not affect air resistance and an exterior of a vehicle. Accordingly, there may be limitations on a shape of a camera.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a camera module includes a lens module including a lens barrel and a holder to hold the lens barrel, a heater to seal the lens module and including a first cutting portion having a D-shape, and a ring-shaped electrode portion including a second cutting portion having a D-shape and a third cutting portion having a D-shape. The electrode portion is coupled to two surfaces of the heater that are perpendicular to an optical axis direction to align the first cutting portion with the second cutting portion and the third cutting portion.

The electrode portion may include a power connection line withdrawn from a portion of the electrode portion other than a portion of the electrode portion including the second cutting portion and the third cutting portion.

The heater and the electrode portion may be disposed between the holder and the lens barrel.

The lens barrel may include a first coupling flange extended in a direction perpendicular to the optical axis direction, the holder may include a second coupling flange to face the first coupling flange, and the heater and the electrode portion may be disposed between the first coupling flange and the second coupling flange.

The holder may be fastened to the lens barrel by a screw connection.

One of the holder and the lens barrel may include a guide protrusion configured to guide a position of the heater.

The holder may include a substrate coupled to a lower portion of the holder, and the power connection line may be connected to the substrate.

The substrate may include a connector to be connected to the power connection line, and the power connection line may be inserted into the connector by penetrating through a coupling hole in the holder.

The camera module may include an upper housing coupled to a lower housing to form an internal space to receive the lens module in the internal space, and the lower housing may include a main substrate to be connected to the substrate.

The power connection line may bypass the holder and the substrate to be directly connected to the main substrate.

In another general aspect, a camera module includes a lens barrel including a first flange extended in a direction perpendicular to an optical axis direction, a holder to hold the lens barrel, and including a second flange extended in the direction perpendicular to the optical axis direction, a heater disposed between the first flange and the second flange, and a protrusion extended between the first flange and the second flange to secure the heater between the first flange and the second flange.

The camera module may include a first electrode coupled to a first surface of the heater between the lens barrel and the heater; and a second electrode coupled to a second surface of the heater between the holder and the heater.

The camera module may include a substrate including a connector, and a power connection line extended from one or both of the first electrode and the second electrode to be connected to the connector.

The power connection line may extend from the one or both of the first electrode and the second electrode in an area in which the heater is exposed externally of the lens barrel.

In another general aspect, a camera module includes a lens barrel, a holder to hold the lens barrel, a cylindrical heater disposed between opposing surfaces of the lens barrel and the holder parallel to an optical axis direction, and a power connection line to supply power to the heater and extended externally of the lens barrel.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
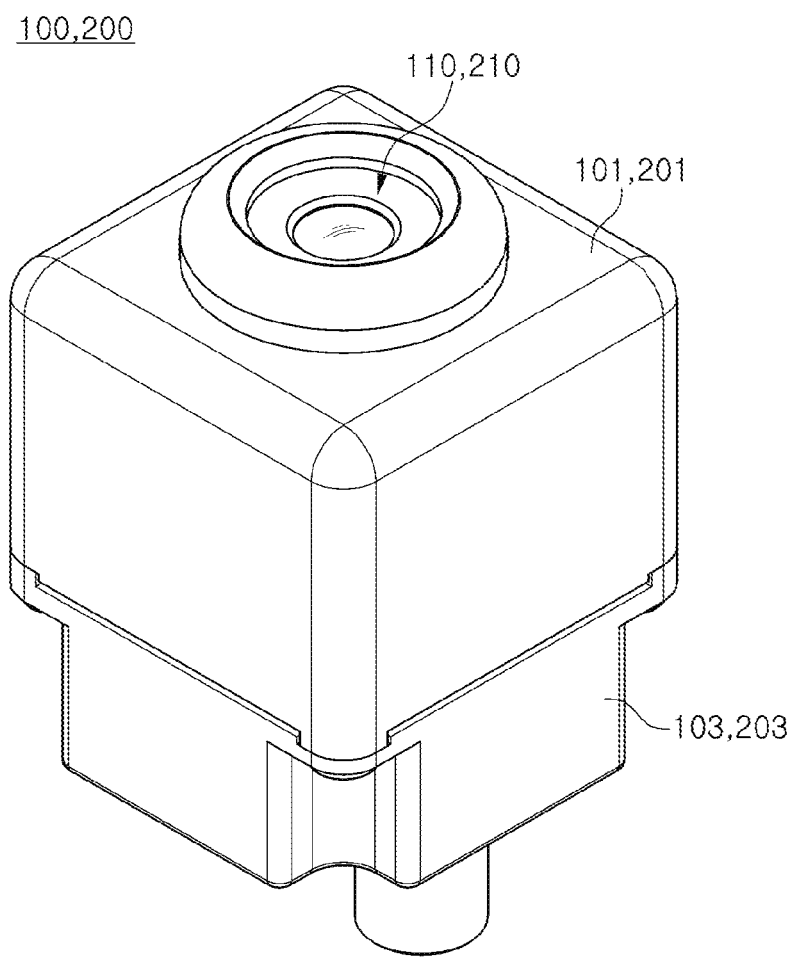
FIG. 1 is a combined perspective diagram illustrating a camera module according to an example.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Herein, it is noted that use of the term "may" with respect to an example or embodiment, e.g., as to what an example or embodiment may include or implement, means that at least one example or embodiment exists in which such a feature is included or implemented while all examples and embodiments are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

Figure 2:
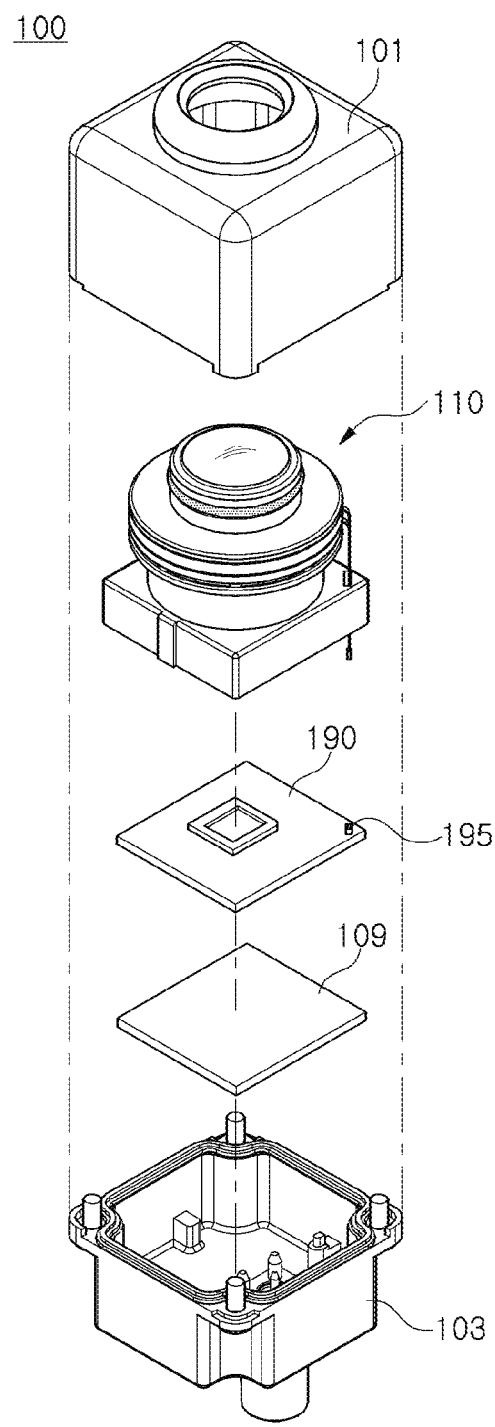
FIG. 2 is an exploded perspective diagram illustrating a camera module according to an example.
Figure 3:
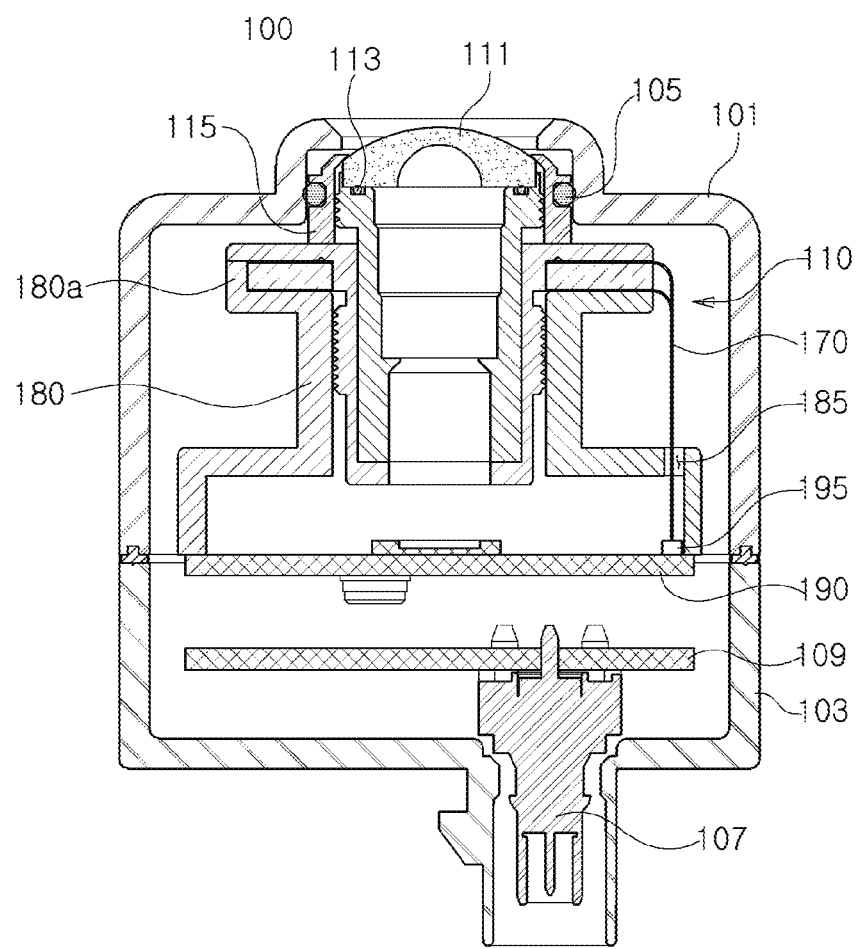
FIG. 3 is a combined cross-sectional diagram illustrating a camera module according to an example.
Figure 4:
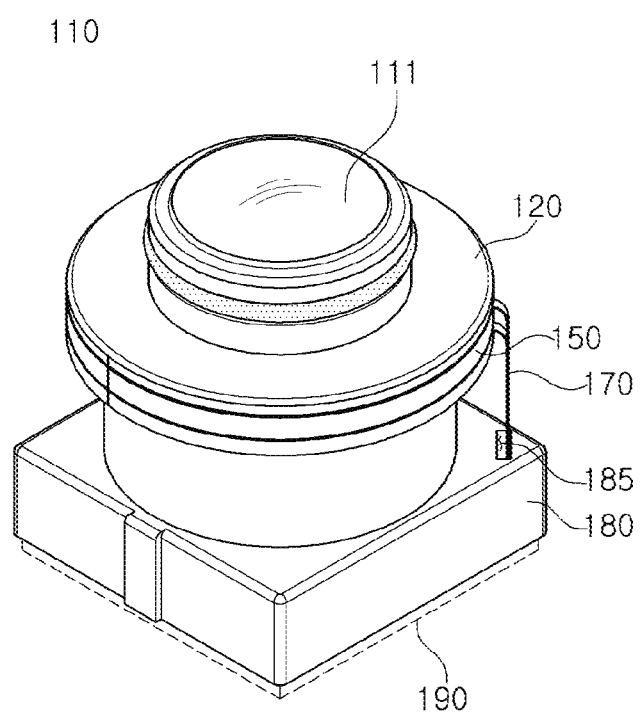
FIG. 4 is a combined perspective diagram illustrating a lens module according to an example.
Figure 5:
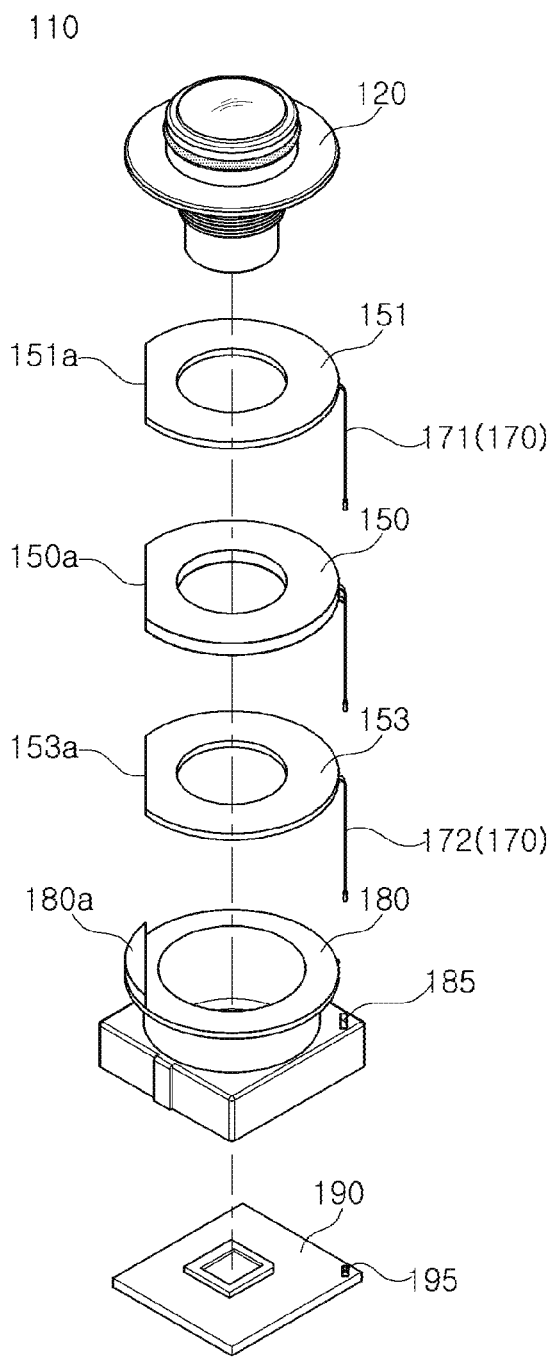
FIG. 5 is an exploded perspective diagram illustrating a lens module according to an example.
Figure 6:
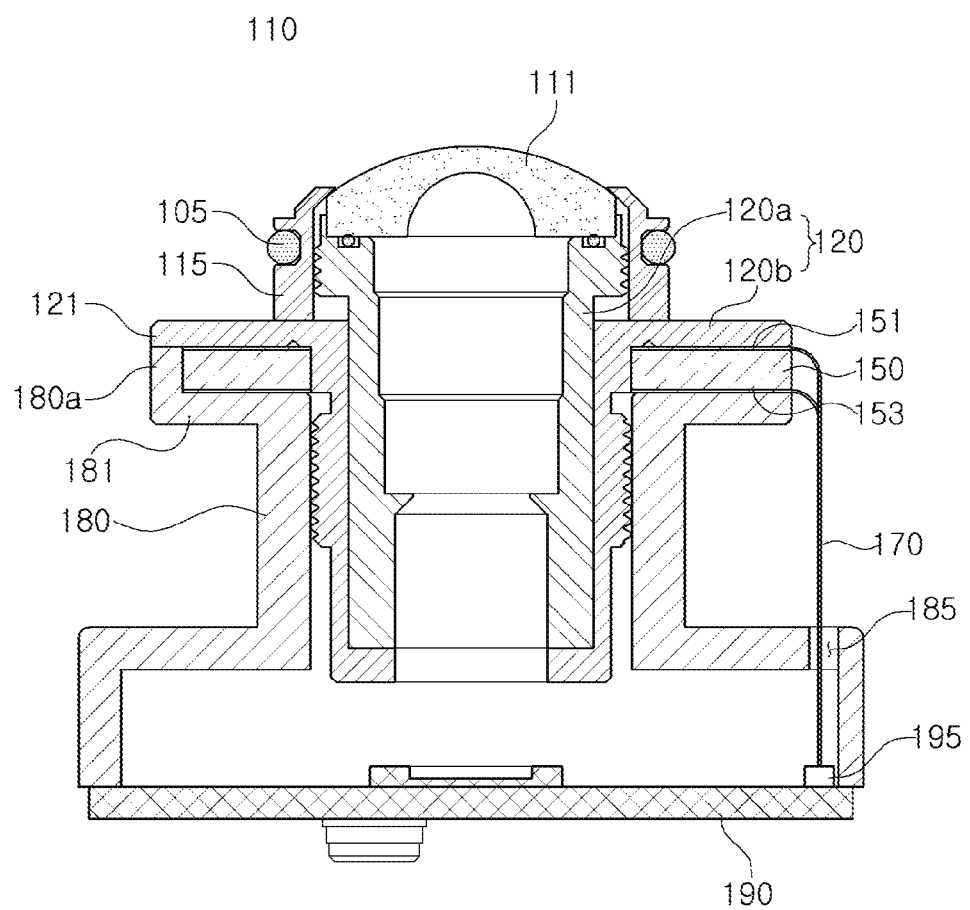
FIG. 6 is a combined cross-sectional diagram illustrating a lens module according to an example.

FIG. 1 is a combined perspective diagram illustrating a camera module according to an example. FIG. 2 is an exploded perspective diagram illustrating a camera module according to an example. FIG. 3 is a combined cross-sectional diagram illustrating a camera module according to an example. FIG. 4 is a combined perspective diagram illustrating a lens module according to an example. FIG. 5 is an exploded perspective diagram illustrating a lens module according to an example. FIG. 6 is a combined cross-sectional diagram illustrating a lens module according to an example.

Referring to FIGS. 1, 2, and 3, a camera module 100 may include an upper hosing 101, a lower housing 103, a lens module 110 provided in an internal space formed by coupling of the upper housing 101 and the lower housing 103, and a substrate 190 connected to the lens module 110 through a power connection line 170.

A cover glass 111 may be provided in an upper end portion of the lens module 110, and a sealing member 113 formed of a material such as silicon, rubber, or the like, may be inserted between the cover glass 111 and the lens module 110 to enhance airtightness. The cover glass 111 may be firmly fastened by an additional member 115 fastened to the lens module 110 by a screw connection.

A sealing member 105 formed of a material such as silicon, rubber, or the like, may be inserted between the lens module 110 and the upper housing 101 to enhance airtightness.

A connector 107 may be provided in a lower end portion of the lower housing 103 for power connection or control connection. A main substrate 109 may be provided in addition to the substrate 190 provided in the lens module 110, and the substrate 190 may be electrically or controllably connected to the main substrate 109.

Referring to FIGS. 3 to 6, the lens module 110 may include a lens barrel 120, a heater 150, a power connection line 170, and a holder 180.

At least one lens may be stacked inside the lens barrel 120, and the cover glass 111 may be coupled to an upper end portion of the lens barrel 120. The additional member 115 may be fastened to the upper end portion of the lens barrel 120 by screw connection to fix the cover glass 111.

The lens barrel 120 may include a first lens barrel 120a in which a lens is inserted and a second lens barrel 120b coupled externally of the first lens barrel 120a. The first lens barrel 120a and the second lens barrel 120b may be implemented as separate components, or may be integrated with each other.

The lens barrel 120 may be configured to have a first coupling flange 121 protruding in a direction perpendicular to an optical axis direction to insert a heater 150 in the first coupling flange 121. The first coupling flange 121 may have a disk shape. As the heater 150 is disposed externally of the lens barrel 120, a material of the lens barrel 120 may be a metal having good thermal conductivity. For example, a material of the lens barrel 120 may be aluminum (Al), or the like. A material of the lens barrel 120 may also be a non-metal material such as plastic.

The holder 180 may be coupled to a lower portion of the lens barrel 120 in an optical axis direction by a screw connection or bonded by an adhesive. For a screw connection between the lens barrel 120 and the holder 180, a screw thread may be provided in the lens barrel 120 and the holder 180.

The holder 180 may be configured to have a second coupling flange 181 protruding in a direction perpendicular to an optical axis direction to insert the heater 150 between the first coupling flange 121 and the second coupling flange 181. The second coupling flange 181 may have a disk shape.

The heater 150 may be coupled while being inserted between the lens barrel 120 and the holder 180. The heater 150 may have a disk shape (a donut or toroidal shape), and may be inserted between the first coupling flange 121 and the second coupling flange 181 opposing the lens barrel 120 and the holder 180 in an optical axis direction. The heater 150 may also have a cutting portion 150a having a "D" shape in one portion of the heater 150, and the heater 150 may be easily assembled together with the camera module 110 by the cutting portion 150a. The cutting portion 150a may serve to guide an assembling position.

Electrodes 151 and 153 may be coupled to both surfaces of the heater 150, respectively, and the electrodes 151 and 153 may be connected to power connection lines 171 and 172, respectively. The electrodes 151 and 153 may have a disk shape (a donut or toroidal shape) corresponding to the shape of the heater 150, and a material of the electrodes 151 and 153 may be a metal having good conductivity, but is not limited to metal as long as the material is conductive. Cutting portions 151a and 153a having a "D" shape may be provided in one portions of the electrodes 151 and 153, respectively, such that the electrodes 151 and 153 may be coupled, to be aligned with the cutting portion 150a provided in the heater 150, and such that the heater 150 to which the electrodes 151 and 153 are coupled may be easily assembled together with the camera module 110. The cutting portions 151a and 153a may serve to guide an assembling position. The cutting portions 151a and 153a may be provided in a position other than a portion in which the power connection lines 171 and 172 are withdrawn, or in the same portion in which the power connection lines 171 and 172 are withdrawn.

The power connection lines 171 and 172 may be connected to the electrodes 151 and 153 and be withdrawn. In the case in which the holder 180 and the lens barrel 120 are coupled to each other by screw connection, an exact position may need to be secured to assemble the components, and thus, the guiding function of the cutting portions 151a and 153a may be advantageous to assemble the components.

For example, in the case in which a protrusion portion 180a is provided on an upper surface of the holder 180 to guide the cutting portions 150a, 151a, and 153a, and the heater 150 to which the electrodes 151 and 153 are coupled is mounted on the protrusion 180a, an exact position may be secured. Alternatively, the protrusion 180a serving as a guide protrusion may be provided in a lower surface of the lens barrel 120, more specifically, in a lower surface of the first coupling flange 121, rather than on an upper surface of the holder 180.

To firmly fix the heater 150 having a disk shape, the first coupling flange 121 may be provided in the lens barrel 120, the second coupling flange 181 may be provided in the holder 180, and the heater 150 may be inserted between surfaces of the first coupling flange 121 and the second coupling flange 181 opposing in an optical axis direction. The heater 150 may have a shape approximately identical to the shapes of the first coupling flange 121 and the second coupling flange 181.

An inner end portion of the heater 150, that is, an inner diameter portion of the heater 150 may contact an outer surface of the lens barrel 120, and an outer end portion of the heater 150, that is, an outer diameter portion of the heater 150 may be exposed externally of the lens module 110.

The heater 150 may be connected to the substrate 190 through the power connection line 170 and may be supplied with power. The power connection line 170 may be extended from the portion of the heater 150 exposed externally of the lens module 110, and may penetrate through the holder 180 and be connected to a connector 195 on the substrate 190.

The holder 180 may be fixed and coupled to an external surface of the lens barrel 120. The holder 180 may be coupled to the lens barrel 120 by screw connection or bonded by an adhesive. For screw connection between the lens barrel 120 and the holder 180, a screw thread may be provided in the lens barrel 120 and the holder 180.

The holder 180 may be configured to have a coupling hole 185 to insert the power connection line 170 in the connector 195 provided in the substrate 190. The power connection line 170 may be connected to the connector 195 through the coupling hole 185.

The substrate 190 may be fixed and coupled to a lower portion of the holder 180. The substrate 190 may be bonded and coupled to the holder 180 by screw connection or using an adhesive to allow the connector 195 to be exposed through the coupling hole 185.

Figure 7:
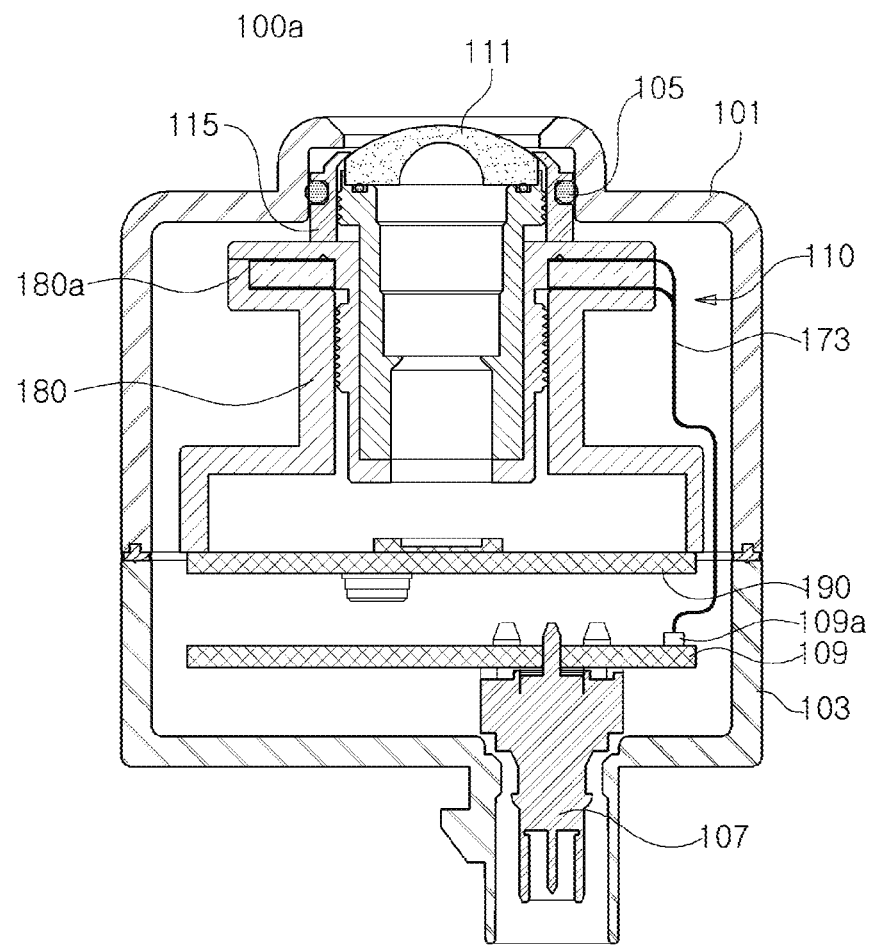
FIG. 7 is a combined cross-sectional diagram illustrating a lens module according to an example.

FIG. 7 is a combined cross-sectional diagram illustrating a lens module according to an example.

Referring to FIG. 7, in the lens module, overall elements may be the same as discussed above, and may be different only in that a power connection line 173 for supplying power to a heater 150 may be connected to a connector 109a on a main substrate 109 by bypassing a holder 180, not penetrating through the holder 180.

Thus, in a camera module 100a, the power connection line 173 connected to the heater 150 and extended externally may bypass the holder 180 and be connected to a connector 109a on the main substrate 109.

Figure 8:
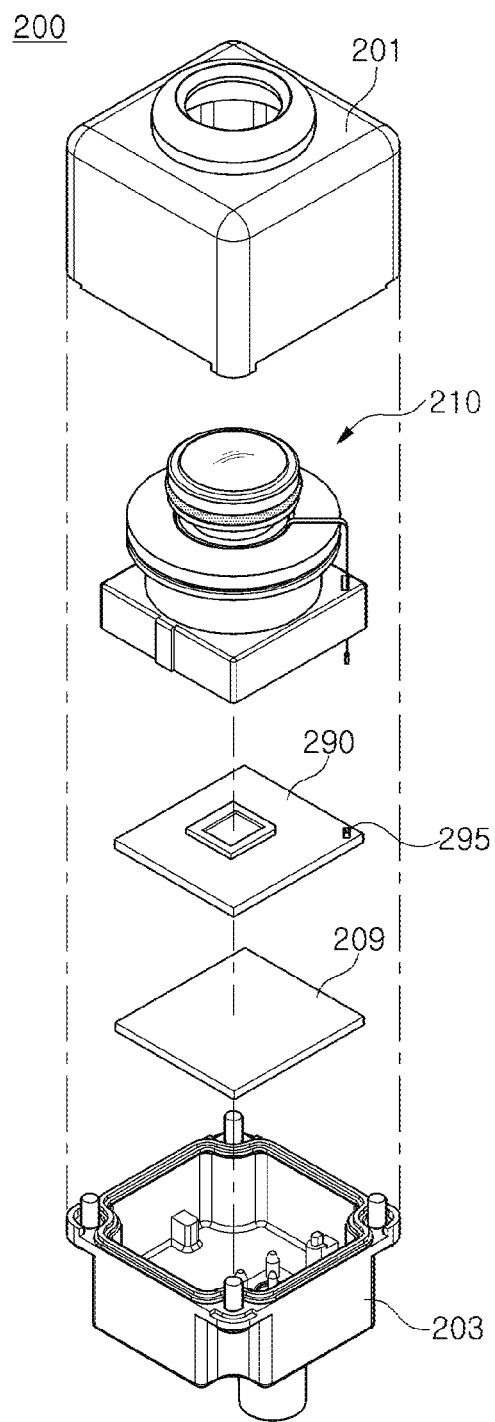
FIG. 8 is an exploded perspective diagram illustrating a camera module according to an example.
Figure 9:
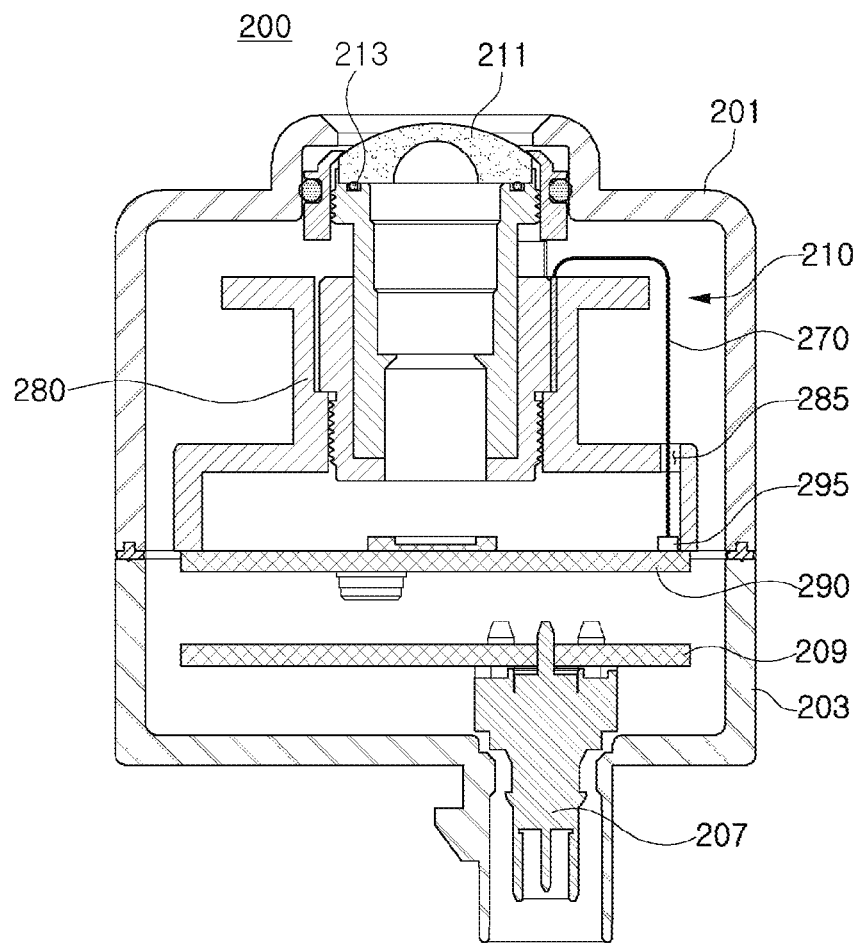
FIG. 9 is a combined cross-sectional diagram illustrating a camera module according to an example.
Figure 10:
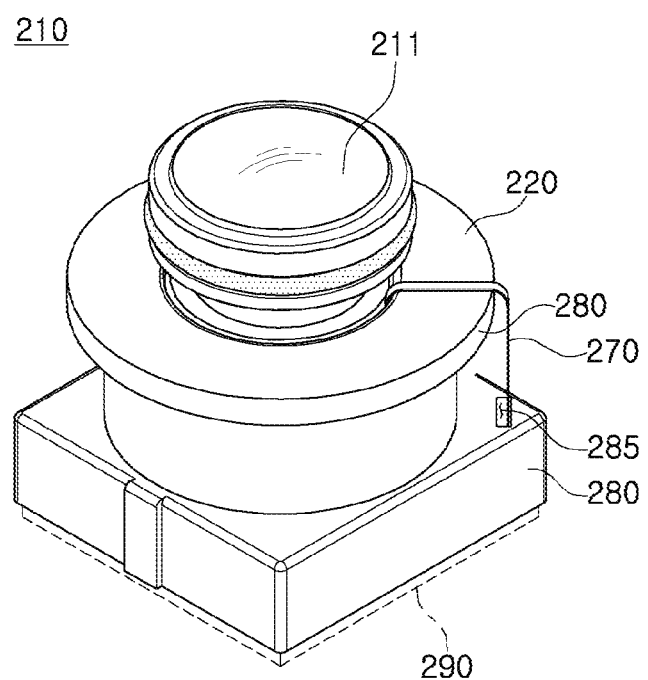
FIG. 10 is a combined perspective diagram illustrating a lens module according to an example.
Figure 11:
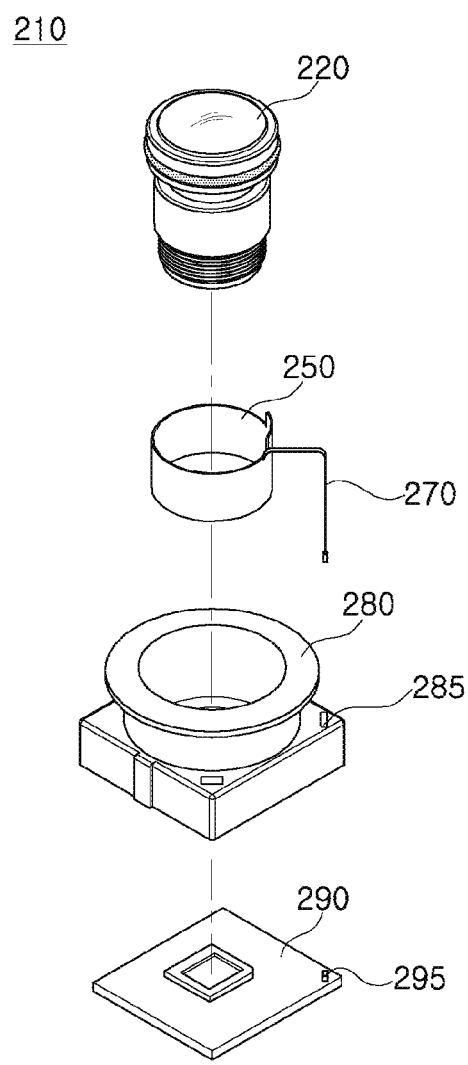
FIG. 11 is an exploded perspective diagram illustrating a lens module according to an example.
Figure 12A:
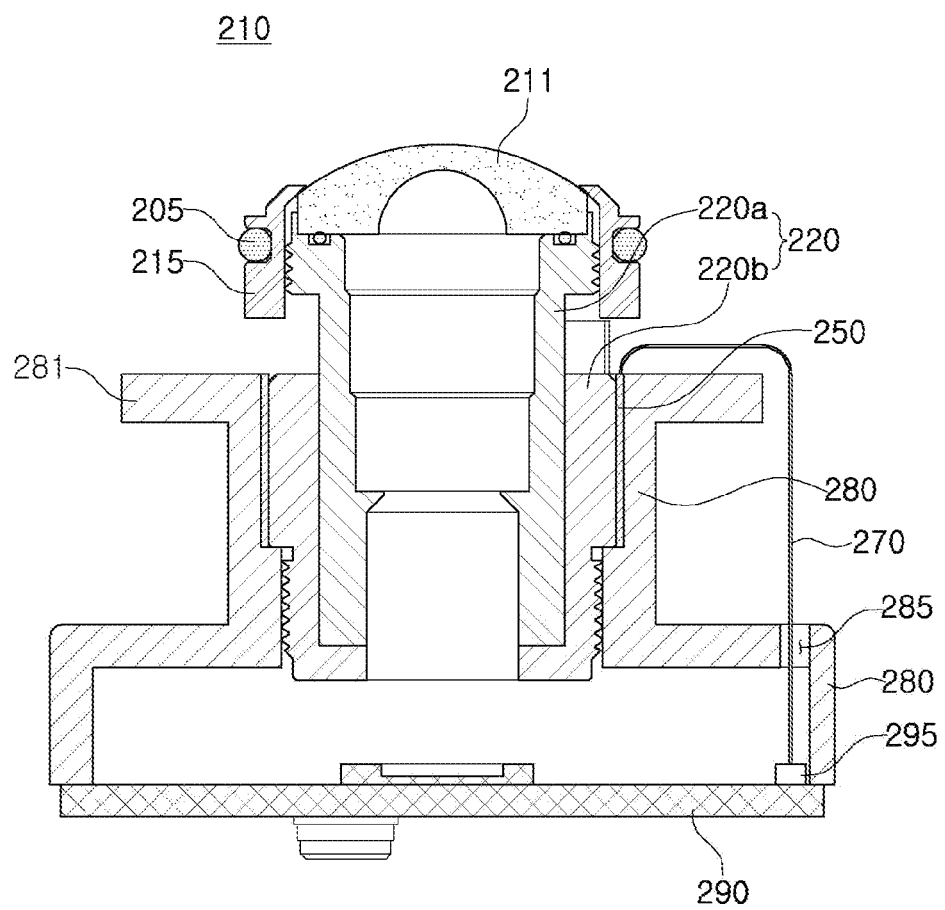
FIGS. 12A and 12B are combined cross-sectional diagrams illustrating a lens module according to an example.
Figure 12B:
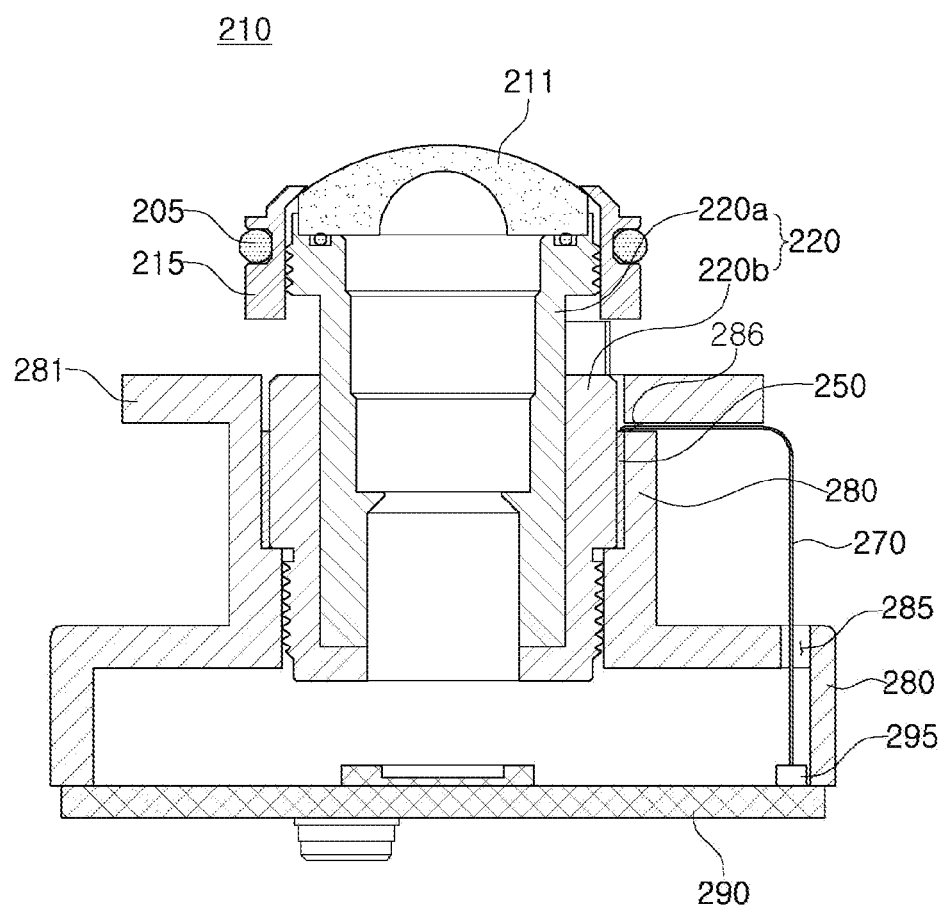

FIG. 1 is a combined perspective diagram illustrating a camera module according to an example. FIG. 8 is an exploded perspective diagram illustrating a camera module according to an example. FIG. 9 is a combined cross-sectional diagram illustrating a camera module according to an example. FIG. 10 is a combined perspective diagram illustrating a lens module according to an example. FIG. 11 is an exploded perspective diagram illustrating a lens module according to an example. FIGS. 12A and 12B are combined cross-sectional diagrams illustrating a lens module according to an example.

Referring to FIGS. 1 and 8, a camera module 200 may include an upper housing 201, a lower housing 203, a lens module 210 provided in an internal space formed by coupling of the upper housing 201 and the lower housing 203, and a substrate 290 connected to the lens module 210 through a power connection line 270.

A cover glass 211 may be provided in an upper portion of the lens module 210, and a sealing member 213 formed of a material such as silicon, rubber, or the like, may be inserted between the cover glass 211 and the lens module 210 to enhance airtightness. The cover glass 211 may be firmly fastened by an additional member 215 fastened to the lens module 210 by screw connection.

A sealing member 205 formed of a material such as silicon, rubber, or the like, may be inserted between the lens module 210 and the upper housing 201 to enhance airtightness.

A connector 207 may be provided in a lower end portion of the lower housing 203 for power connection or control connection. A main substrate 209 may be provided in addition to the substrate 290 provided in the lens module 210, and the substrate 290 may be electrically or controllably connected to the main substrate 209.

Referring to FIGS. 9 to 12B, the lens module 210 may include a lens barrel 220, a heater 250, a power connection line 270, and a holder 280.

At least one lens may be stacked inside the lens barrel 220, and the cover glass 211 may be coupled to an upper end portion of the lens barrel 220. The additional member 215 may be fastened to the upper end portion of the lens barrel 220 by screw connection to fix the cover glass 211.

The lens barrel 220 may include a first lens barrel 220a in which a lens is inserted and a second lens barrel 220b coupled externally of the first lens barrel 220a. The first lens barrel 220a and the second lens barrel 220b may be implemented as separate components or may be integrated with each other.

The lens barrel 220 may have a cylindrical shape to inserted into a heater 250. As the heater 250 is provided externally of the lens barrel 220, a material of the lens barrel 220 may be a metal having good conductivity. For example, a material of the lens barrel 220 may be aluminum (Al) having good processability, but is not limited to such a material. The material may also be a non-metal material such as plastic other than a metal material.

The holder 280 may be coupled to a lower portion of the lens barrel 220 in an optical axis direction by screw connection or bonded by an adhesive. For screw connection between the lens barrel 220 and the holder 280, a screw thread may be provided in the lens barrel 220 and the holder 280.

The holder 280 may have a cylindrical shape lengthened in an optical axis direction to insert the heater 250 to an internal surface of the holder 280.

The heater 250 may be coupled while being inserted between the lens barrel 220 and the holder 280. The heater 250 may have a cylindrical shape having both ends being opened, and may be inserted between opposing surfaces of the lens barrel 220 and the holder 280 parallel to an optical axis direction.

The heater 250 may be connected to the substrate 290 through the power connection line 270 and be supplied with power. The power connection line 270 may be extended from the portion of the heater 250 exposed externally of the lens module 210, and may penetrate through the holder 280 and be connected to a connector 295 on the substrate 290.

As illustrated in FIG. 12A, in the case in which an upper end portion of the heater 250 is extended close to an uppermost end portion of the holder 280 in an optical axis direction, the power connection line 270 may be withdrawn between boundary surfaces of the lens barrel 220 and the holder 280 opposing in parallel to an optical axis direction. The power connection line 270 may be withdrawn towards the uppermost end portion of the holder 280 in an optical axis direction.

As illustrated in FIG. 11B, in the case in which an upper end portion of the heater 250 is not extended to the uppermost end portion of the holder 280, the power connection line 270 may be withdrawn externally of the lens module 210 through a withdrawal hole 286 provided in the holder 280.

The holder 280 may be fixed and coupled to an external surface of the lens barrel 220. The holder 280 may be configured to have a third coupling flange 281 protruding in a direction perpendicular to an optical axis direction in an upper portion in an optical axis direction. The holder 280 and the lens barrel 220 may be coupled to each other by screw connection or bonded by an adhesive. For a screw connection between the lens barrel 220 and the holder 280, a screw thread may be provided in the lens barrel 220 and the holder 280.

A coupling hole 285 may be provided in the holder 280 to connect the power connection line 285 to the connector 295 provided in the substrate 290. Through the coupling hole 285, the power connection line 270 may penetrate through the holder 280 and be inserted and connected to the connector 295.

The substrate 290 may be fixed and coupled to a lower portion of the holder 280.

In the examples, the heater 150,250 may be provided in various manners. The heater 150,250 may be a resistor generating heat by supply of current (power), and the heater 150,250 may be formed of a material having resistance such as a metal, a heating wire, a ceramic (positive temperature coefficient; PTC), and the like. An electrode may be directly connected to the resistor, or the resistor and the electrode may be layered on the substrate for use.

Figure 13:
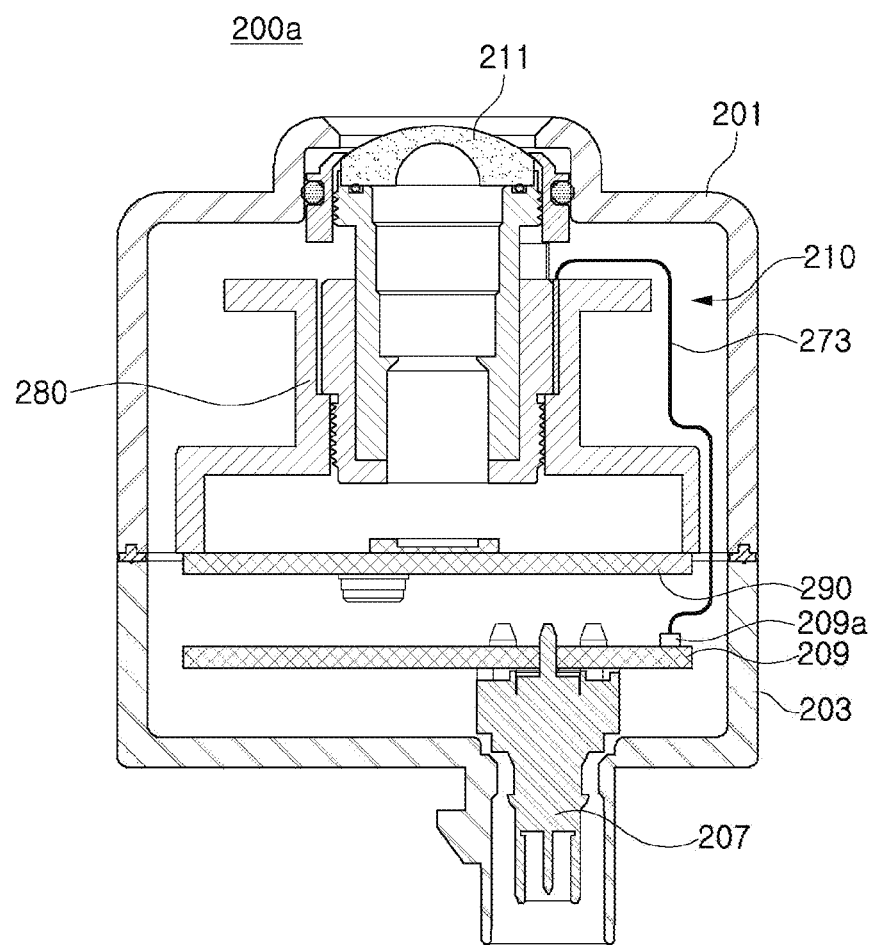
FIG. 13 is a combined cross-sectional diagram illustrating a lens module according to an example.

FIG. 13 is a combined cross-sectional diagram illustrating a lens module according to an example.

Referring to FIG. 13, in the lens module, some components may be the same as described above, and may be different only in that a power connection line 273 for supplying power to the heater 250 may be directly connected to a main substrate 209 by bypassing a holder 280, and not penetrating through the holder 280.

In a camera module 200a, the power connection line 273 connected to the heater 250 and extended externally may bypass the holder 280 to be connected to a connector 209a on the main substrate 209.

Figure 14:
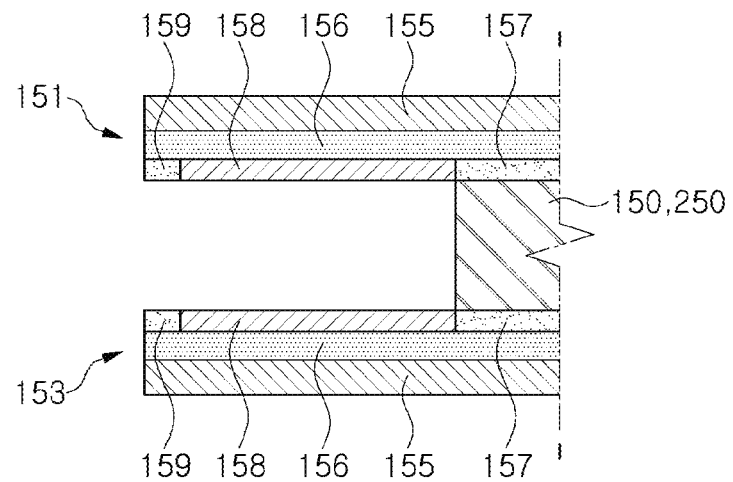
FIG. 14 is a partial cross-sectional diagram illustrating an electrode coupled to a ceramic heater according to an example.

Referring to FIG. 14, a heater 150,250 may be a ceramic type, and may be configured to have electrodes 151 and 153 on both surfaces for power supply.

The heater 150,250 may be a type of a thermistor, and may be a ceramic type formed by molding and baking a positive temperature coefficient (PTC) having resistance increasing depending on temperature. Electrodes 151 and 153 may be attached to both surfaces of the heater 150,250. For example, in the case in which the heater 150 has a disk shape, the electrodes 151 and 153 may also have a disk shape approximately identical to the shape of the heater 150. In the case in which the heater 250 has a cylindrical shape, the electrodes 151 and 153 may also have a cylindrical shape approximately identical to the shape of the heater 250.

The electrodes 151 and 153 may be configured to have a withdrawal line connected to a connector 195,295 on the substrate 190,290, and the withdrawal line may be the power connection line 170,270.

As illustrated in FIG. 14, for example, first and second electrodes 151 and 153 may be comprised of a base film 155, a copper layer 156 layered on an upper portion of the base film 155, and conductive layers 157 and 159 and a protective layer 158 layered on an upper portion of the copper layer 156. The conductive layers 157 and 159 may include a heater contacting layer 157 contacting a heater and a terminal layer 159 contacting a connector 195, and the above layers may be implemented by layering a material having good conductivity, that is, by plating gold, or the like, for example. The protective layer 158 may be a film and protect the copper layer.

Figure 15:
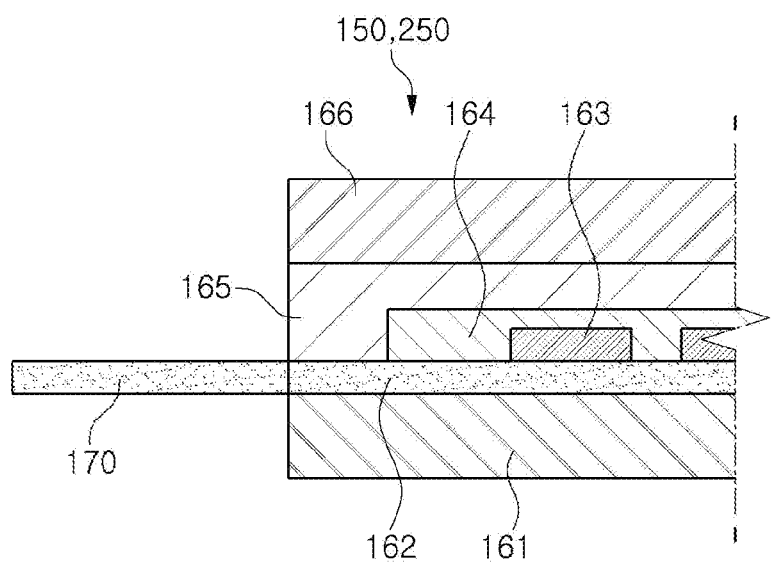
FIG. 15 is a partial cross-sectional diagram illustrating a film type heater according to an example.

Referring to FIG. 15, a heater 150,250 may be a film type.

The heater 150,250 may be a film formed by deposing or patterning ink including a heating material 163 on a film type base substrate 161. The heating material 163 may be a metal, a heating wire, a ceramic (positive temperature coefficient; PTC), and the like. The PTC may be a type of a thermistor, and have resistance increasing depending on temperature.

As illustrated in FIG. 15, for example, the film type heater 150,250 may include a base substrate 161, an electrode layer 162 layered on an upper portion of the base substrate 161, the heating material 163 patterned to the electrode layer 162, a coating layer 164 layered on upper portions of the electrode layer 162 and the heating material 163, and an upper substrate 166 provided in an upper portion of the coating layer 164. A bonding layer 165 may be provided between the upper substrate 166 and the coating layer 164.

The electrode layer 162 may be configured to have a withdrawal line connected to a connector 195,295 on a substrate 190,290, and the withdrawal line may be a power connection line 170,270.

As set forth above, in the camera module according to the examples, even when a heater is added to the camera module, there may be no need to substantially change a shape and a size of the camera module, and heat may be transferred to a lens in an efficient manner. Thus, a camera module having an improved performance may be provided.

In the camera module according to the examples, a power connection line of a heater provided internally of a lens barrel may be easily connected to a substrate, and thus, manufacturing and assembling processes may be simplified.

The examples provide a camera module in which heating performance of a camera is improved without significantly changing an exterior of a camera, the camera module can be easily assembled.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A camera module, comprising:
   a lens module comprising a lens barrel and a holder configured to hold the lens barrel;
   a ring-shaped heater configured to surround the lens module and comprising a first cutout portion having a D-shape;
   a first ring-shaped electrode member comprising a second cutout portion having a D-shape; and
   a second ring-shaped electrode member comprising a third cutout portion having a D-shape,
   wherein the first and second ring-shaped electrode members are configured to be coupled to two surfaces of the ring-shaped heater that are perpendicular to an optical axis direction to align the first cutout portion with the second cutout portion and the third cutout portion,
   wherein one of the holder and the lens barrel comprises a guide protrusion configured to guide a position of the ring-shaped heater.

2. The camera module of claim 1, wherein the electrode portion comprises a power connection line withdrawn from a portion of the electrode portion other than a portion of the electrode portion comprising the second cutout portion and the third cutout portion.

3. The camera module of claim 2, wherein the holder comprises a substrate coupled to a lower portion of the holder, and the power connection line is connected to the substrate.

4. The camera module of claim 3, wherein the substrate comprises a connector configured to be connected to the power connection line, and the power connection line is inserted into the connector by penetrating through a coupling hole in the holder.

5. The camera module of claim 3, further comprising:
an upper housing coupled to a lower housing to form an internal space to receive the lens module in the internal space,
wherein the lower housing comprises a main substrate configured to be connected to the substrate.

6. The camera module of claim 5, wherein the power connection line bypasses the holder and the substrate to be directly connected to the main substrate.

7. The camera module of claim 1, wherein the ring-shaped heater and the electrode portion are disposed between the holder and the lens barrel.

8. The camera module of claim 7, wherein the lens barrel comprises a first coupling flange extended in a direction perpendicular to the optical axis direction, the holder comprises a second coupling flange configured to face the first coupling flange, and the ring-shaped heater and the electrode portion are disposed between the first coupling flange and the second coupling flange.

9. The camera module of claim 7, wherein the holder is fastened to the lens barrel by a screw connection.

10. The camera module of claim 1, wherein the ring-shaped heater further comprises a power connection line disposed at a position spaced apart from a position of the first cutout portion.

11. The camera module of claim 1, wherein the ring-shape heater further comprises a power connection line disposed at a position opposite a position of the first cutout portion.

12. A camera module, comprising:
a lens barrel comprising a first flange extended in a direction perpendicular to an optical axis direction;
a holder configured to hold the lens barrel, and comprising a second flange extended in the direction perpendicular to the optical axis direction;
a heater disposed between the first flange and the second flange, wherein the heater surrounds the lens barrel and has a D-shape; and
a protrusion extended between the first flange and the second flange and configured to secure the heater between the first flange and the second flange.

13. The camera module of claim 12, further comprising:
a first electrode coupled to a first surface of the heater between the lens barrel and the heater; and
a second electrode coupled to a second surface of the heater between the holder and the heater.

14. The camera module of claim 13, further comprising:
a substrate comprising a connector; and
a power connection line extended from one or both of the first electrode and the second electrode and configured to be connected to the connector.

15. The camera module of claim 14, wherein the power connection line extends from the one or both of the first electrode and the second electrode in an area in which the heater is exposed externally of the lens barrel.

16. A camera module, comprising:
a lens barrel;
a holder configured to hold the lens barrel;
a cylindrical heater disposed between opposing surfaces of the lens barrel and the holder parallel to an optical axis direction, wherein the heater surrounds the lens barrel and has a D-shape; and
a power connection line configured to supply power to the heater and extended externally of the lens barrel,
wherein one of the holder and the lens barrel comprises a guide protrusion configured to guide a position of the heater.

* * * * *